(12) United States Patent
Schrems et al.

(10) Patent No.: US 8,524,191 B2
(45) Date of Patent: Sep. 3, 2013

(54) PROCESS FOR PREPARING HIGH-PURITY ALUMINUM OXIDE BY PURIFICATION OF ALUMINA

(75) Inventors: Marcus Georg Schrems, Ludwigshafen (DE); Anna Katharina Dürr, Ludwigshafen (DE); Günther Huber, Ludwigshafen (DE); Jesus Enrique Zerpa Unda, Stuttgart (DE); Katrin Freitag, Ludwigshafen (DE); Christian Eichholz, Mannheim (DE); Franky Ruslim, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/413,278

(22) Filed: Mar. 6, 2012

(65) Prior Publication Data

US 2013/0040801 A1 Feb. 14, 2013

Related U.S. Application Data

(60) Provisional application No. 61/515,987, filed on Aug. 8, 2011.

(51) Int. Cl.
*C01F 7/00* (2006.01)
(52) U.S. Cl.
USPC .......................... 423/625; 423/628; 501/153
(58) Field of Classification Search
USPC .................. 423/625, 628; 502/27–29, 439; 501/153
See application file for complete search history.

(56) References Cited

U.S. PATENT DOCUMENTS

| 2,995,510 | A | * | 8/1961 | Bertolacini et al. | 208/139 |
| 3,104,944 | A | * | 9/1963 | Hayes | 423/127 |
| 3,532,460 | A | * | 10/1970 | Snyder | 423/625 |
| 8,003,566 | B2 | * | 8/2011 | Casci et al. | 502/328 |
| 2010/0021374 | A1 | * | 1/2010 | Mizuno et al. | 423/625 |

* cited by examiner

*Primary Examiner* — Steven Bos
(74) *Attorney, Agent, or Firm* — Novak Druce Connolly Bove + Quigg LLP

(57) ABSTRACT

A process for preparing aluminum oxide with a low calcium content, in which
(1) crude alpha- and/or gamma-aluminum oxide with a total calcium content in the range from 50 to 2000 ppm, based on the crude alpha- and/or gamma-aluminum oxide, is mixed with an aqueous solution or suspension comprising the compounds selected from the group of inorganic acid, organic acid and complexing agent,
(2) the mixture from step (1) is admixed with a flocculating aid,
(3) in the mixture of step (2), the solids are separated from the liquid,
(4) the solids separated are mixed with water in the presence or in the absence of a flocculating aid,
(5) in the mixture of step (4), the solids are separated from the liquid,
(6) optionally, steps (4) and (5) are repeated once or more than once,
(7) optionally, the solids separated optionally after addition of further compounds, are dried.

21 Claims, No Drawings

PROCESS FOR PREPARING HIGH-PURITY ALUMINUM OXIDE BY PURIFICATION OF ALUMINA

CROSS-REFERENCE TO RELATED APPLICATIONS

This application claims benefit (under 35 USC 119(e)) of U.S. Provisional Application 61/515,987, filed Aug. 8, 2011, which is incorporated by reference.

BACKGROUND OF THE INVENTION

The present invention relates to a process for preparing high-purity aluminum oxide and to the use of the aluminum oxide thus obtained as defined in each of the claims.

Aluminum oxide ($Al_2O_3$) per se is known.

High-purity aluminum oxide is required inter alia for ion-conducting ceramics. For this purpose, the content of extraneous metals, more particularly of calcium, must not be greater than 50 ppm. Preference is given to even smaller calcium contents.

Ion-conducting ceramics are described, for example, in J. L. Sudworth and A. R. Tilley, The Sodium Sulphur Battery, Chapman and Hall, New York (1985) and are used inter alia as an electrolyte in electrochemical cells, for example as electrical batteries or synthesis cells for alkali metals. In simplified terms, ion-conducting ceramics are generally produced as follows: aluminum oxide, an alkali metal source, generally alkali metal salts, and further additives are shaped (green bodies) and sintered at very high temperature.

Pure aluminum oxide is commercially available but is frequently so expensive that it is prohibitive for industrial use.

JP 5-17043 (SUMITOMO) describes a process for preparing an aluminum oxide with a low CaO content, by washing aluminum oxide which has been obtained by a Bayer process and in which the CaO content is 120 ppm or less with an organic acid, and filtering. A frequent occurrence here is that the fine aluminum oxide is present floating in the suspension and can only be filtered very slowly, which is disadvantageous in an industrial process.

U.S. Pat. No. 3,104,944 describes a process for preparing aluminum oxide, wherein an aluminum salt comprising an ionic alkaline earth metal impurity is converted at an acidic pH of 4.5 to 7 to an aluminum hydroxide hydrogel, and the alkaline metal is extracted with an amino-substituted carboxylic acid, and the hydrogel is washed and calcined.

A SUMMARY OF THE INVENTION

It was an object of the present invention to remedy the disadvantages of the prior art and to provide a process which allows pure aluminum oxide to be obtained from contaminated alumina, and is suitable especially for the production of ion-conducting ceramics. The object was achieved by the process defined in the claims and the use defined in the claims.

The alpha- and/or gamma-aluminum oxide which serves as a starting material generally has a total calcium content in the range from 50 to 2000 ppm, for example 200 to 1000 ppm, based in each case on the crude alpha- and/or gamma-aluminum oxide and understood as ppm by weight.

The aluminum oxide content of the crude alpha- and/or gamma-aluminum oxide which serves as the starting material is typically 99.5 to 99.8% by weight, based on the crude alpha- and/or gamma-aluminum oxide. Possible further impurities in this crude alpha- and/or gamma-aluminum oxide include the following elements: silicon, sodium, iron, titanium.

The mean particle size of the optionally ground, crude alpha- and/or gamma-aluminum oxide which serves as the starting material is typically in the range from 0.5 to 200 micrometers, for example 2 micrometers.

The crude alpha- and/or gamma-aluminum oxide which serves as the starting material, also called "alumina" and supplied, for example, as the commercial form of "sinter-active alumina", with the above-specified total calcium content, is mixed in a first step with an aqueous solution or suspension comprising the compounds selected from the group of inorganic acid, organic acid and complexing agent, for example by admixing the crude alpha- and/or gamma-aluminum oxide with water and one or more compounds selected from the group of inorganic acid, organic acid and complexing agents.

The inorganic or organic acids or the complexing agents, or any mixtures of these components, are also referred to hereinafter as "extractants".

The inorganic acids used may be: nitric acid, hydrochloric acid, hydrobromic acid, hydrofluoric acid, hydroiodic acid, phosphoric acid, sulfurous acid, sulfuric acid, sulfonic acids such as methanesulfonic acid, phosphorous acid or other inorganic acids.

The organic acids used may be: formic acid, acetic acid, propionic acid, and other organic acids. Among the organic acids, preference is given to acids which are miscible with water and are liquid at room temperature. Particular preference is given to aliphatic acids of the RCOOH form where R, for example, is selected from H, $CH_3$, $CH_2CH_3$.

The complexing agents used may be: complexing agents based on nitrilotriacetic acid, complexing agents based on ethylenediaminetetraacetic acid, complexing agents based on hydroxyethylethylenediaminetriacetic acid, complexing agents based on methylglycinediacetic acid, complexing agents based on diethylenetriaminepentaacetic acid. In each case, the acids or else salts thereof may be used here. Preference is given to the sodium salts or the ammonium salts of the abovementioned complexing agents. Very particular preference is given to the sodium salts.

For the performance of the process, preference is given to using nitric acid, hydrochloric acid, formic acid, acetic acid, or one or more of the abovementioned complexing agents. Very particular preference is given to nitric acid.

The acids may already be diluted, or be added in concentrated form. Of good suitability are aqueous dilute organic or inorganic acids or mixtures thereof, the water content of which is, for example, in the range from 35 to 99.9% by weight, preferably in the range from 70 to 99.9% by weight.

The abovementioned complexing agents are likewise used advantageously in aqueous solution or aqueous suspension, in which case the water content thereof, based on the finished solution or suspension, is, for example, in the range from 70 to 99.99% by weight, preferably in the range from 80 to 99.99% by weight.

The mixing of the crude alpha- and/or gamma-aluminum oxide which serves as a starting material with the extractant can be accomplished in the customary apparatuses, for example in an open stirred vessel.

The mixture from step 1 is, preferably after a certain time, admixed in step 2 with a flocculating aid, for example by stirring. This can be accomplished in the vessel in which the mixture has been produced in step 1, or during the transfer to a second vessel.

Flocculating aids are known in principle. They are usually high molecular weight organic substances such as polymers or polyelectrolytes.

The inventive flocculating aid comprises anionic or cationic or nonionic (synonym: uncharged) organic high molecular weight flocculating aids, or a combination thereof.

Examples of inventive anionic flocculating aids are polyacrylic salts of the alkali metals—such as poly(sodium acrylate)—and polyacrylamide substituted by carboxyl groups.

Examples of nonionic inventive flocculating aids are polyacrylamide, poly(ethylene oxide) or polymers of 1-vinyl-2-pyrrolidone, N-vinylformamide.

Examples of cationic inventive flocculating aids are polyethyleneimine ("PEI"), salts, for example the chloride, of poly[2-(N,N,N-trimethylamino)ethyl acrylate], poly[N-dimethylamino-methyl]acrylamide in quaternized form, polymers of substituted acrylamide and/or methacrylamide in the respective salt form, polymers of N-vinylformamide and/or vinylacetamide which are hydrolyzed under alkaline or acidic conditions to the corresponding "vinylamine" polymers, polymers of N-vinylimidazole and/or of 2-vinylpyridine and/or of 4-vinylpyridine, in each case in salt form.

Preferred inventive flocculating aids are cationic or nonionic flocculating aids and a combination of cationic and uncharged flocculants, in each case as described above. Particular preference is given to nonionic flocculating aids, for example polyacrylamide, poly(ethylene oxide) or polymers of 1-vinyl-2-pyrrolidone, N-vinylformamide.

Inventive flocculating aids are described, for example, in the brochure "Sedipur® types for water treatment" from TENSID CHEMIE/BASF Group from August 2002.

Examples of such flocculating aids are polyacrylamide (nonionic), polyacrylamide substituted by carboxyl groups (anionic), polyacrylamide substituted by COR groups ($R=O-CH_2-CH_2-N(CH_3)_3Cl$) (cationic), polyethyleneimine (PEI), poly-DADMAC, polyamines (see page 7 of said brochure).

In step 3, in the mixture from step 2, the solids are separated from the liquid, preferably by sedimentation, for example by transferring the mixture from step 2 into a further vessel in which sedimentation takes place (sedimentation 1). The sedimentation takes place, for example, in a gravitational separator, for example a settling tank. Some or all of the liquid removed (wastewater 1) can be reused as an extractant, or else discarded. In a preferred embodiment, the liquid is partly recycled or discarded; in a particularly preferred embodiment, the liquid is discarded.

The solids removed are mixed with water in step 4, for example in an open stirred vessel. Preference is given to admixing with a flocculating aid, for example Sedipur®. This can be done in the stirred vessel, or during transfer to a further vessel. In an alternative embodiment, the addition of the flocculating aid in step 4 is dispensed with.

In step 5, in the mixture of step 4, the solids are separated from the liquid g, preferably by sedimentation, for example by transferring the mixture from step 4 into a further vessel in which sedimentation takes place (sedimentation 2). The sedimentation takes place, for example, in a gravitational separator, for example a settling tank. Some or all of the liquid removed (wastewater 2) can be reused in step 1 in place of the water, or else discarded. In a preferred embodiment, the liquid is partly recycled or discarded; in a particularly preferred embodiment, the liquid is partly recycled.

Optionally, in a step 6, steps 4 and 5 can be repeated twice or more, or else omitted. In a preferred embodiment, steps 4 and 5 are each performed once and not repeated.

Steps 1 to 6 can generally be performed within a temperature range from 10° C. up to the boiling point of the extractant used. These steps are preferably performed within a temperature range from 15° C. to 50° C.; these steps are most preferably performed within a temperature range from 15° C. to 30° C. Steps 1 to 6 can be performed within a pressure range from 100 mbar to 10 000 mbar. The procedure is preferably conducted at atmospheric pressure.

Optionally, in a step 7, the solids removed from step 6, together with the residues of water present therein, are dried by the customary methods for drying inorganic suspensions, for example spray drying, and are optionally then calcined.

Optionally, in a step 7, the solids removed from step 6, together with the residues of water present therein, are mixed with further additives. This mixture can then be ground and dried, preferably spray-dried.

Other separation methods than sedimentation to remove the solids from the liquid, for example filtration or centrifugation, have been found to be possible but non-optimal.

The wastewaters formed in the inventive process are, in the course of performance of the process, especially in its preferred form, neither toxic nor hazardous to the environment.

The process described can be performed continuously or batchwise. Continuous performance can be effected by means of a cascade of stirred vessels.

The pure aluminum oxide obtainable by the process according to the invention can advantageously be used for production of sintered shaped bodies or precursors thereof, called the green bodies, as described by way of example hereinafter, a little further down.

Possible sintered shaped bodies include all regularly or irregularly shaped bodies—also referred to as ceramics, for example cylinders open at both ends, such as tubes; cylinders closed at one end, for example what are called crucibles; disks, angular plaques, rods and tubes with hole patterns.

For example, the sintered shaped bodies, preferably cylinders closed at one end, disks or angular plaques, are ion-conducting ceramics, preferably alkali metal ion-conducting ceramics. Ion-conducting ceramics are described, for example, in J. L. Sudworth and A. R. Tilley, The Sodium Sulphur Battery, Chapman and Hall, New York (1985). They are used, for example, in electrochemical processes, such as electrolysis cells for production of alkali metals or electrochemical batteries.

In simplified terms, sintered shaped bodies (ceramics) are generally produced as follows: aluminum oxide and optionally further additives are shaped (green body) and sintered at very high temperature.

In simplified terms, ion-conducting ceramics are generally produced as follows: aluminum oxide, an alkali metal source, generally alkali metal salts, and further additives are shaped (green body) and sintered at very high temperature.

EXAMPLES

The aluminum oxide used for purification was alpha-aluminum oxide with a calcium content of 180 ppm, for example "sinter-active alumina" from NABALTEC.

The calcium content according to the examples which follow was measured by the method of "optical atomic emission spectroscopy (ICP-AES). The dried sample of the product to be analyzed was boiled in concentrated hydrochloric acid for 30 minutes. A sample was taken from the supernatant phase. The calcium content is finally determined by optical atomic emission spectroscopy (ICP-AES) after filtration with a 0.2 μm filter.

Sedipur® is a brand of BASF SE.

Example 1 alpha-Aluminum oxide (25 g, Ca content: 180 ppm) was admixed with 250 g of a 0.1 molar $Na_2EDTA$ solution (Titriplex III solution), and the mixture was stirred at room temperature for 4 h. The resulting suspension could not be decanted. Subsequently, the suspension was filtered through a glass suction filter over the course of 1.5 hours. The residue was four times slurried with water and filtered again. The purified aluminum oxide was subsequently dried at 120° C. and 20 mbar for 20 h and analyzed for its Ca content. The analysis gave a Ca content of 50 ppm.

Example 2 alpha-Aluminum oxide (5 g, Ca content: 180 ppm) was admixed with 25 g of a 32% aqueous hydrochloric acid, and the mixture was stirred at reflux for 30 min. The resulting suspension could not be decanted. Subsequently, the suspension was filtered through a membrane suction filter over the course of several hours. The residue was three times slurried with water (25 ml) and filtered again; the third time, washes were centrifuged. The purified aluminum oxide was subsequently dried at 120° C. and 20 mbar for 20 h and analyzed for its Ca content. The analysis gave a Ca content of less than 10 ppm.

Example 3 alpha-Aluminum oxide (5 g, Ca content: 180 ppm) was admixed with 25 g of a 5% aqueous nitric acid, and the mixture was stirred at room temperature for 35 min. The resulting suspension could not be decanted. Subsequently, the suspension was filtered through a membrane suction filter over the course of several hours. The residue was three times slurried with water (25 ml) and filtered again. The purified aluminum oxide was subsequently dried at 120° C. and 20 mbar for 20 h and analyzed for its Ca content. The analysis gave a Ca content of less than 30 ppm.

Example 4 alpha-Aluminum oxide (5 g, Ca content: 180 ppm) was admixed with 25 g of a 5% aqueous nitric acid, and the mixture was stirred at room temperature for 30 min. The resulting suspension could not be decanted. Once the aluminum oxide had substantially settled out, 15 ml of the nitric acid were cautiously removed with a pipette and 25 ml of water were added to the mixture of aluminum oxide and nitric acid. The mixture was stirred again for 30 min and allowed to settle out over several hours, and 25 ml of the supernatant were removed cautiously with a pipette. Subsequently, 20 ml of water were added to the mixture of aluminum oxide and nitric acid. The mixture was stirred again for 30 min. After 1 hour, it was still not apparent that any aluminum oxide had settled out. Therefore, the mixture was centrifuged (30 min, 3500 rpm). This operation was repeated twice more with 50 ml each time of water. The solids obtained after the centrifugation were dried at 120° C. and 10 mbar for 20 h and analyzed for their Ca content. The analysis gave a Ca content of 30 ppm.

The above examples 1 to 4 show that the inventive extractants lead to a significant reduction in the calcium content of the starting sample, but that the solid/aqueous phase separation is still non-optimal.

Example 5 alpha-Aluminum oxide (20 g, Ca content: 180 ppm) was admixed with 100 g of a 5% aqueous nitric acid and stirred at room temperature for 30 min. The resulting suspension could not be decanted. Subsequently, 4 g of a 0.1% (by weight) Sedipur® NF 104 solution (nonionic polyacrylamide with moderate to high molar mass) were added. There was rapid flocculation, and complete sedimentation with a clear supernatant within less than 60 sec. The supernatant was decanted off and the residue was washed with 100 g of water. There was again rapid sedimentation here, but with a cloudy supernatant. The supernatant was decanted, the residue transferred into a dish together with the residual water. The sample was dried at 120° C. and 10 mbar for 20 h and analyzed for its calcium, nitrogen and carbon contents. The analysis gave a Ca content of 16 ppm, a nitrogen content of 0.058% and a total carbon content of 0.16%. Subsequently, the sample was calcined at 1200° C. and analyzed again for its nitrogen and carbon contents. The analysis gave a nitrogen content of <0.001% and a total carbon content of 0.018%.

Example 6 alpha-Aluminum oxide (20 g, Ca content: 180 ppm) was admixed with 100 g of a 5% aqueous nitric acid and stirred at room temperature for 30 min. The resulting suspension could not be decanted. Subsequently, 4 g of a 0.1% (by weight) aqueous Sedipur® NF 106 solution (nonionic polyacrylamide with moderate to high molar mass) were added. There was rapid flocculation, and complete sedimentation with a clear supernatant within less than 60 sec. The supernatant was decanted off and the residue was washed with 100 g of water. There was again rapid sedimentation here, but with a cloudy supernatant. The supernatant was decanted, the residue transferred into a dish together with the residual water. The sample was dried at 120° C. and 10 mbar for 20 h and analyzed for its calcium, nitrogen and carbon contents. The analysis gave a Ca content of 25 ppm, a nitrogen content of 0.069% and a total carbon content of 0.13%. Subsequently, the sample was calcined at 1200° C. and analyzed again for its nitrogen and carbon contents. The analysis gave a nitrogen content of <0.001% and a total carbon content of 0.010%.

Example 7 alpha-Aluminum oxide (20 g, Ca content: 180 ppm) was admixed with 100 g of a 10% by weight aqueous acetic acid and stirred at room temperature for 30 min. The resulting suspension could not be decanted. Subsequently, 6.25 g of a 0.1% (by weight) aqueous Sedipur NF 104 solution (nonionic polyacrylamide with moderate to high molar mass) were added. There was rapid flocculation and complete sedimentation with a cloudy supernatant within less than 60 sec. The supernatant was decanted off and the residue was washed with 100 g of water. There was again rapid sedimentation here, but with a very cloudy supernatant. The supernatant was decanted, the residue transferred into a dish together with the residual water. The sample was dried at 120° C. and 10 mbar for 20 h and analyzed for its calcium content. The analysis gave a Ca content of 70 ppm.

Examples 5 to 7 show that nonionic flocculants bring about rapid solid/liquid phase separation.

Example 8 alpha-Aluminum oxide (20 g, Ca content: 180 ppm) was admixed with 100 g of water and stirred at room temperature for 30 min. The resulting suspension could not be decanted. Subsequently, 4 g of a 0.1% (by weight) Sedipur® NF 104 solution (nonionic polyacrylamide with moderate to high molar mass) were added. There was rapid flocculation and complete sedimentation with a clear supernatant within less than 60 sec. The supernatant was decanted off and the residue was washed with 100 g of water. There was again rapid sedimentation here, but with a somewhat cloudy supernatant. The supernatant was decanted, the residue transferred into a dish together with the residual water. The sample was dried at 120° C. and 10 mbar for 20 h and analyzed for its calcium, nitrogen and carbon content. The analysis gave a Ca content of 170 ppm, a nitrogen content of 0.014% and a total carbon content of 0.16%.

Example 8 shows that water alone as the extractant does not bring about any significant reduction in the calcium content of the starting material.

Example 9 alpha-Aluminum oxide (20 g, Ca content: 180 ppm) was admixed with 100 g of a 5% aqueous nitric acid and stirred at room temperature for 30 min. The resulting suspension could not be decanted. Subsequently, 4 g of a 0.1% (by weight) Sedipur NF 104 solution (nonionic polyacrylamide with moderate to high molar mass) were added. There was rapid flocculation and complete sedimentation with a clear supernatant within less than 60 sec. The supernatant was decanted off and the residue was washed with 100 g of water. There was again rapid sedimentation here, but with a cloudy supernatant. The supernatant was decanted, the residue transferred into a dish together with the residual water. The sample was dried at 120° C. and 10 mbar for 20 h and analyzed for its calcium, nitrogen and carbon content. The analysis gave a Ca content of 16 ppm, a nitrogen content of 0.058% and a total carbon content of 0.16%. Subsequently, the sample was calcined at 1200° C., and analyzed again for its nitrogen and carbon contents. The analysis gave a nitrogen content of <0.001% and a total carbon content of 0.018%.

Example 9 shows that the flocculating aid essentially does not remain as a potentially troublesome organic residue in the calcium-depleted material.

The invention claimed is:

1. A process for preparing aluminum oxide with a low calcium content, in which
   (1) crude alpha- and/or gamma-aluminum oxide with a total calcium content in the range from 50 to 2000 ppm, based on the crude alpha- and/or gamma-aluminum oxide, is mixed with an aqueous solution or suspension comprising an inorganic acid, an organic acid, a complexing agent, or mixtures thereof,
   (2) the mixture from step (1) is admixed with a first flocculating aid,
   (3) in the mixture of step (2), solids are separated from liquid,
   (4) the solids separated are mixed with water in the presence or in the absence of a second flocculating aid,
   (5) in the mixture of step (4), solids are separated from liquid, and
   (6) optionally, steps (4) and (5) are repeated once or more than once.

2. The process according to claim 1, wherein the separation of the solids from the liquid in steps (3) and/or (5) is accomplished by sedimentation.

3. The process according to claim 1, wherein step (4) is performed in the presence of the second flocculating aid.

4. The process according to claim 3, wherein the first and second flocculating aid is selected from the group consisting of an anionic, cationic, and uncharged flocculating aid.

5. The process according to claim 3, wherein the first and second flocculating aid is selected from the group consisting of polyacrylamide, polyacrylamide substituted by carboxyl groups, polyacrylamide substituted by COR groups, wherein R=O—CH$_2$—CH$_2$—N(CH$_3$)$_3$Cl, polyethyleneimine, polyDADMAC, and polyamine.

6. The process according to claim 1, wherein the liquid from step (5) is recycled partly into step (1) as a medium for mixing.

7. A process for production of shaped bodies, said process comprising shaping a composition comprising the aluminum oxide obtained in step 6 of the process of claim 1 to give a green body, and sintering the green body.

8. The process according to claim 7, wherein the shaped bodies are open cylinders or cylinders closed at one end, disks or angular plaques.

9. The process according to claim 7, wherein the shaped bodies are sintered shaped bodies.

10. The process according to claim 7, wherein the shaped bodies are ion-conducting ceramics.

11. The process according to claim 7, wherein the shaped bodies are alkali metal ion-conducting ceramics.

12. The process according to claim 7, wherein the composition comprises other components.

13. The process according to claim 1, which further comprises a seventh step, wherein further compounds are added to the separated solids of steps (3) and (5), and the resulting mixture is dried.

14. The process according to claim 1, wherein
    the inorganic acid is selected from the group consisting of nitric acid, hydrochloric acid, hydrobromic acid, hydrofluoric acid, hydroiodic acid, phosphoric acid, sulfurous acid, sulfuric acid, sulfonic acids, and phosphorous acid,
    the organic acid is miscible with water and is a liquid at room temperature, and
    the complexing agent in the salt or acid form thereof is selected from the group consisting of complexing agents comprising nitrilotriacetic acid, complexing agents comprising ethylenediaminetetraacetic acid, complexing agents comprising hydroxyethylethylenediaminetriacetic acid, complexing agents comprising methylglycinediacetic acid, and complexing agents comprising diethylenetriaminepentaacetic acid.

15. The process according to claim 1, wherein
    the inorganic acid is selected from the group consisting of nitric acid, hydrochloric acid, hydrobromic acid, hydrofluoric acid, hydroiodic acid, phosphoric acid, sulfurous acid, sulfuric acid, methanesulfonic acid, and phosphorous acid,
    the organic acid is miscible with water and is a liquid at room temperature, and
    the complexing agent in the salt or acid form thereof is selected from the group consisting of complexing agents comprising nitrilotriacetic acid, complexing agents comprising ethylenediaminetetraacetic acid, complexing agents comprising hydroxyethylethylenediaminetriacetic acid, complexing agents comprising methylglycinediacetic acid, and complexing agents comprising diethylenetriaminepentaacetic acid.

16. The process according to claim 1, wherein
    the inorganic acid is selected from the group consisting of nitric acid and hydrochloric acid, the organic acid is selected from the group consisting of formic acid, acetic acid, and propionic acid, and the complexing agent comprises EDTA in the salt or acid form thereof.

17. The process according to claim 1, wherein step (6) is required.

18. The process according to claim 1, wherein the first and second flocculating aid is a nonionic flocculating aid.

19. The process according to claim 3, wherein the first and second flocculating aid is a nonionic flocculating aid.

20. The process according to claim 1, wherein the first and second flocculating aid is selected from the group consisting of an anionic, cationic, and uncharged flocculating aid.

21. The process according to claim 1, wherein the first and second flocculating aid is selected from the group consisting of polyacrylamide, polyacrylamide substituted by carboxyl groups, polyacrylamide substituted by COR groups, wherein $R=O-CH_2-CH_2-N(CH_3)_3Cl$, polyethyleneimine, poly-DADMAC, and polyamine.

* * * * *